Patented Jan. 17, 1939

2,144,464

UNITED STATES PATENT OFFICE 2,144,464

KETO CARBOXYLIC ACIDS DERIVED FROM TERPENE-MALEIC ANHYDRIDE ADDITION PRODUCTS AND PROCESS OF PREPARING THEM

John Harrison Sachs, Wilmington, Del., assignor to E. I. du Pont de Nemours & Company, Wilmington, Del., a corporation of Delaware No Drawing. Application March 24, 1938, Serial No. 197,869

8 Claims. (Cl. 260—341)

This invention relates to new chemical compounds. More specifically it relates to new keto carboxylic acids and their derivatives, which are useful in the field of synthetic resins and elsewhere.

It is known that the addition reaction of maleic anhydride and alpha-terpinene gives a product useful in the making of synthetic resins. This product may be represented by the formula:

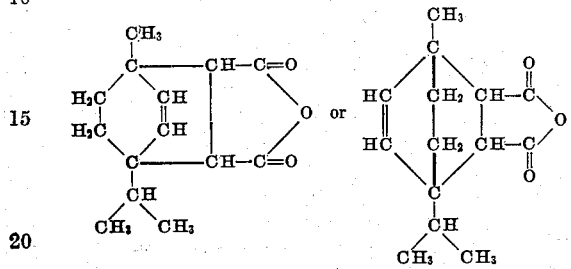

The scientific name for this terpinene-maleic anhydride addition product is 3,6-endoethylene-3-methyl-6-isopropyl-1,2,3,6-tetrahydro-1,2-phthalic anhydride.

It is an object of this invention to prepare new organic chemical compounds. A further object is the preparation of new keto carboxylic acids and their derivatives. A still further object is to prepare keto carboxylic acids from the alpha-terpinene-maleic acid addition product above described. Further objects will appear hereinafter.

According to the present invention, new keto carboxylic acids are prepared by reacting the alpha-terpinene-maleic acid addition product above described with aromatic organic compounds. This step is preferably performed in the presence of condensing agents of the type employed in the Friedel-Crafts reaction, such as aluminum chloride. The condensation product thus produced is decomposed, for example, by dilute hydrochloric acid. The excess aromatic organic compound is removed from the thus produced keto carboxylic acid, for example, by steam distillation.

In order that the invention may be more fully understood, the following examples, in which the quantities of materials are specified as parts by weight, are set forth by way of illustration, but the invention is not limited thereto as will more fully appear hereinafter.

Example I

The alpha-terpinene-maleic acid addition product in the amount of 100 parts is dissolved in 600 parts of benzene at 50° C. Aluminum chloride ($AlCl_3$) in the amount of 120 parts is gradually added, and the reaction mass is refluxed for one-half hour until no more hydrochloric acid is developed. The mass is cooled to room temperature and run into dilute hydrochloric acid. The excess benzene is removed by steam distillation. The product is filtered and washed with water. The crude product is purified by dissolving in dilute caustic soda solution, filtering from impurities, reprecipitating by acid, filtering, washing and drying.

The product is an almost colorless solid, melting at 80° C., insoluble in water, soluble in the usual organic solvents such as alcohol, benzene, etc. and in a solution of sodium hydroxide or carbonate. It is a monobasic acid and is believed to have the following formula:

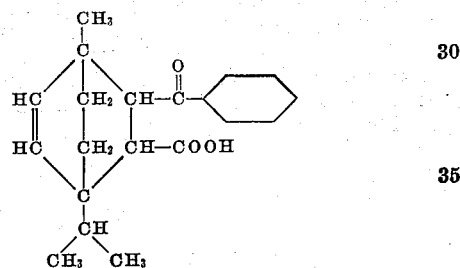

Example II

The same procedure is carried out using toluene in place of benzene and a product is obtained which starts to soften at 35° C. and has properties similar to the benzene derivative.

The alpha-terpinene-maleic acid addition product may be similarly reacted with other materials such, for example, as a xylene, chloro or bromo benzene, anisole, phenetole, naphthalene, anthracene, etc., in fact any hydrocarbon or substituted hydrocarbon of the benzene, naphthalene and anthracene series which is adapted to the Friedel-Crafts reaction may be used and is within the scope of the invention. In general, benzene and its homologues are preferred.

Aluminum chloride is the preferred condensing agent but other suitable materials may be used, such, for example, as anhydrous aluminum bromide or mixtures of aluminum chloride, aluminum bromide and/or ferric chloride.

The quantities of reactants, the temperature and time of the reaction and the method of purification may all be varied within wide limits.

A new class of keto carboxylic acids is obtained by this invention. These compounds are useful as resins, plastic masses, softeners, etc. They are, moreover, useful in the preparation of new esters which are also useful as resins, plastics, softeners, etc. This may be illustrated as follows:

*Example III*

The keto carboxylic acid, obtained according to Example II, in the amount of 400 parts is added to 800 parts of normal butyl alcohol at room temperature and the mass is saturated with hydrogen chloride gas and refluxed for four hours. The product is first washed with water, then with dilute caustic solution, then with water again. The excess butyl alcohol and water are removed by vacuum distillation. The remaining product is a viscous oil soluble in the usual organic solvents.

The keto carboxylic acids may be esterified with any alcohol. Primary and secondary monohydric alcohols are preferred as are unsubstituted and substituted polyhydric alcohols. By way of specific example may be mentioned methyl, ethyl, propyl, butyl, amyl, benzyl and bornyl alcohols, ethylene glycol, propylene glycol, glycerol, glycerine monochlor hydrin, glyceric monoethyl ether, glycol monoalkyl ethers, etc.

The process of preparing the esters may be varied within wide limits of temperature and pressure. Where low boiling alcohols are reacted, somewhat elevated pressure during the esterification is advantageous. While it is preferred to use an esterification catalyst such, for example, as dry hydrogen chloride, sulfuric acid, para toluene sulfonic acid, etc., the process may be carried out in the absence of a catalyst.

Suitable changes may be made in the details of the process and any modifications or variations which conform to the spirit of the invention are intended to be included within the scope of the claims.

I claim:
1. The chemical compounds of the formula

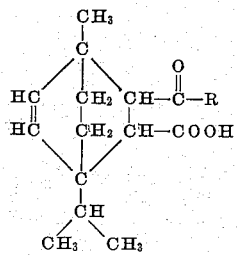

wherein R is an aromatic organic radical.

2. The chemical compounds of the formula

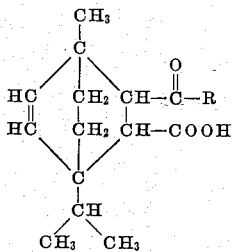

wherein R is an aromatic radical of the benzene series.

3. The chemical compound of claim 2 wherein R is phenyl.

4. The chemical compound of claim 2 wherein R is tolyl.

5. The process which comprises reacting a compound of the formula

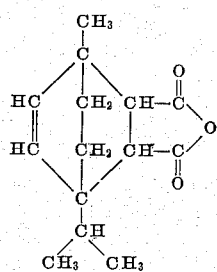

with an aromatic organic compound in the presence of a metal halide condensing agent and decomposing the condensation product thereby formed to produce a keto carboxylic acid.

6. The process of claim 5 in which the condensing agent is $AlCl_3$.

7. The process of claim 5 in which the aromatic organic compound is a member of the benzene series.

8. The process of claim 5 in which the condensing agent is $AlCl_3$ and the aromatic organic compound is a hydrocarbon of the benzene series.

JOHN HARRISON SACHS.